United States Patent
Zhao et al.

(10) Patent No.: US 8,372,678 B2
(45) Date of Patent: Feb. 12, 2013

(54) COUNTER ELECTRODE FOR SOLAR CELL

(75) Inventors: Linan Zhao, Shanghai (CN); Marilyn Wang, Shanghai (CN); Zhi Zheng, Shanghai (CN); Xuanbin Liu, Shanghai (CN)

(73) Assignee: Honeywell International Inc., Morristown, NJ (US)

( * ) Notice: Subject to any disclaimer, the term of this patent is extended or adjusted under 35 U.S.C. 154(b) by 467 days.

(21) Appl. No.: 12/643,829

(22) Filed: Dec. 21, 2009

(65) Prior Publication Data

US 2011/0146777 A1    Jun. 23, 2011

(51) Int. Cl.
*H01L 21/00*    (2006.01)
(52) U.S. Cl. .................... 438/57; 257/E25.009
(58) Field of Classification Search ............ 438/48, 438/57, 98; 136/256; 257/E25.009
See application file for complete search history.

(56) References Cited

U.S. PATENT DOCUMENTS

| | | | |
|---|---|---|---|
| 4,427,749 A | 1/1984 | Graetzel et al. | |
| 4,927,721 A | 5/1990 | Gratzel et al. | |
| 5,677,545 A | 10/1997 | Shi et al. | |
| 6,278,056 B1 | 8/2001 | Sugihara et al. | |
| 6,566,595 B2 | 5/2003 | Suzuki | |
| 6,861,722 B2 | 3/2005 | Graetzel et al. | |
| 6,919,119 B2 | 7/2005 | Kalkan et al. | |
| 6,936,143 B1 | 8/2005 | Graetzel et al. | |
| 7,032,209 B2 | 4/2006 | Kobayashi | |
| 7,042,029 B2 | 5/2006 | Graetzel et al. | |
| 7,091,136 B2 | 8/2006 | Basol | |
| 7,202,412 B2 | 4/2007 | Yamanaka et al. | |
| 7,202,943 B2 | 4/2007 | Chang et al. | |
| 7,268,363 B2 | 9/2007 | Lenhard et al. | |
| 7,462,774 B2 | 12/2008 | Roscheisen et al. | |
| 7,563,507 B2 | 7/2009 | Emrick et al. | |
| 7,655,860 B2 | 2/2010 | Parsons | |
| 2005/0028862 A1 | 2/2005 | Miteva et al. | |
| 2006/0021647 A1 | 2/2006 | Gui et al. | |
| 2006/0070651 A1* | 4/2006 | Kang et al. | 136/256 |
| 2006/0102229 A1* | 5/2006 | Miyoshi et al. | 136/263 |
| 2006/0169971 A1 | 8/2006 | Cho et al. | |
| 2006/0263908 A1 | 11/2006 | Hirai | |
| 2007/0025139 A1 | 2/2007 | Parsons | |

(Continued)

FOREIGN PATENT DOCUMENTS

| | | |
|---|---|---|
| EP | 1473745 | 11/2004 |
| EP | 1689018 | 8/2006 |

(Continued)

OTHER PUBLICATIONS

Chang et al., "Chemical Bath Deposition of CdS Quantum Dots Onto Mesoscopic $TiO_2$ Films for Application in Quantum-Dot-Sensitized Solar Cells," Applied Physics Letters, vol. 91, 3 pages, 2007.

(Continued)

*Primary Examiner* — Brook Kebede
(74) *Attorney, Agent, or Firm* — Seager Tufte & Wickhem LLC (57) ABSTRACT

Disclosed are solar cells and methods for making solar cells. Also disclosed are counter electrodes for solar cells including dye-sensitized and/or nanocrystal-sensitized solar cells. An example counter electrode for a solar cell may include a substrate, a microstructured template disposed on the substrate, and a layer of catalytic material disposed on the microstructured template.

12 Claims, 8 Drawing Sheets

U.S. PATENT DOCUMENTS

| | | |
|---|---|---|
| 2007/0028959 A1 | 2/2007 | Lee et al. |
| 2007/0062576 A1 | 3/2007 | Duerr et al. |
| 2007/0119048 A1 | 5/2007 | Li et al. |
| 2007/0120177 A1 | 5/2007 | McGregor et al. |
| 2007/0122927 A1 | 5/2007 | Li et al. |
| 2007/0123690 A1 | 5/2007 | Parham et al. |
| 2007/0243718 A1 | 10/2007 | Shiratori et al. |
| 2008/0110494 A1 | 5/2008 | Reddy |
| 2008/0264479 A1 | 10/2008 | Harris et al. |
| 2009/0114273 A1 | 5/2009 | Kamat |
| 2009/0159120 A1 | 6/2009 | Wang et al. |
| 2009/0159124 A1 | 6/2009 | Mihaila et al. |
| 2009/0159131 A1 | 6/2009 | Zheng et al. |
| 2009/0159999 A1 | 6/2009 | Zheng et al. |
| 2009/0211634 A1 | 8/2009 | Serban et al. |
| 2009/0260682 A1 | 10/2009 | Serban et al. |
| 2009/0260683 A1 | 10/2009 | Serban et al. |
| 2009/0283142 A1 | 11/2009 | Serban et al. |
| 2009/0308442 A1 | 12/2009 | Liu |
| 2010/0006148 A1 | 1/2010 | Zheng et al. |
| 2010/0012168 A1 | 1/2010 | Mihaila et al. |
| 2010/0012191 A1 | 1/2010 | Serban et al. |
| 2010/0043874 A1 | 2/2010 | Liu |
| 2010/0116326 A1 | 5/2010 | Gur et al. |
| 2010/0193025 A1 | 8/2010 | Serban et al. |
| 2010/0193026 A1 | 8/2010 | Serban et al. |
| 2010/0326499 A1 | 12/2010 | Liu |

FOREIGN PATENT DOCUMENTS

| | | |
|---|---|---|
| EP | 1936644 | 6/2008 |
| JP | 2003059546 A * | 2/2003 |
| JP | 2008177099 | 7/2008 |
| WO | WO 2004/017345 | 2/2004 |
| WO | WO 2006/073562 | 7/2006 |
| WO | WO 2006/099386 | 9/2006 |
| WO | WO 2006/119305 | 11/2006 |
| WO | WO 2007/098378 | 8/2007 |
| WO | WO 2007/100600 | 9/2007 |

OTHER PUBLICATIONS

U.S. Appl. No. 12/542,474, filed Aug. 17, 2009.
U.S. Appl. No. 12/433,560, filed Apr. 30, 2009.
U.S. Appl. No. 12/423,581, filed Apr. 14, 2009.
U.S. Appl. No. 12/484,034, filed Jun. 12, 2009.
U.S. Appl. No. 12/468,755, filed May 19, 2009.
U.S. Appl. No. 12/814,878, filed Jun. 14, 2010.
U.S. Appl. No. 12/614,054, filed Nov. 6, 2009.
U.S. Appl. No. 12/636,402, filed Dec. 11, 2009.
U.S. Appl. No. 12/649,155, filed Dec. 29, 2009.
U.S. Appl. No. 12/690,777, filed Jan. 20, 2010.
U.S. Appl. No. 12/849,719, filed Aug. 3, 2010.
Hodes, "Chemical Solution Deposition of Semiconductor Films," Marcel Dekker Inc., 381 pages, 2002.
Lin et al., "Quantum-Dot-Sensitized Solar Cells: Assembly of CdS-Quantum-Dots Coupling Techniques of Self-Assembled Monolayer and Chemical Bath Deposition," Applied Physics Letters, vol. 90, 3 pages, 2007.
Rafaelle et al., "Quantum Dot—Single Wall Carbon Nanotube Complexes for Polymeric Solar Cells," IEEE, 4 pages, 2005.
Shen et al., "Photoacoustic and Photoelectrochemical Characterization of CdSe-Sensitized $TiO_2$ Electrodes Composed of Nanotubes and Nanowires," Thin Solid Films, vol. 499, pp. 299-305, 2006.
Afzal, "Studies of Cephradine Metal Interactions," 342 pages, Oct. 1998.
Anacona et al., "Synthesis and Antibacterial Activity of Cefotaxime Metal Complexes," Journal of the Chilean Chemical Societ , vol. 50, No. 2, 7 pages, Jun. 2005.
Anacona et al., "Synthesis and Antibacterial Activity of Cefoxitin Metal Complexes," Transition Metal Chemistry, vol. 30, pp. 605-609, 2005.
Asbury et al., "Ultrafast Electron Transfer Dynamics from Molecular Adsorbates to Semiconductor Nanocrystalline Thin Films," Journal of Physical Chemistry B., vol. 105, No. 20, pp. 4545-4557, 2001.
Costa-Bizzarri et al., "Poly[3-Hexyl-4-(6-Bromohexyl)thiophene]: a Key-Intermediate for the Synthesis of Self-Plastifying, Multifunctional Polythiophenes," Polymer, vol. 45, pp. 8629-8637, 2004.
Dennler et al., "Polymer-Fullerene Bulk-Heterojunction Solar Cells," Advanced Materials, vol. 21, pp. 1323-1338, 2009.
Diguna et al., "High Efficiency of CdSe Quantum-Dot-Sensitized $TiO_2$ Inverse Opal Solar Cells," Applied Physics Letters, vol. 91, No. 023116, 3 pages, 2007.
Diol Et al., "Electron Transfer Dynamics at GaAs Surface Quantum Wells," Journal of Physical Chemistry B, vol. 102, pp. 6193-6201, 1998.
El-Maali et al., "Voltammetric Analysis of Cu (II), Cd (II) and Zn (II) Complexes and their Cyclic Voltammetry with Several Cephalsoporin Antibiotics," Bioelectrochemistry, vol. 65, pp. 95-104, 2005.
Enescu, Medicamente, pp. 292-293, 2005.
Enright et al., "Spectroscopic Determination of Electron and Hole Effective Masses in a Nanocrystalline Semiconductor Film," Journal of Physical Chemistry vol. 100, No. 3, pp. 1027-1035, 1996.
Galoppini, "Linkers for Anchoring Sesitizers to Semiconductor Nanoparticles," Coordination Chemistry Reviews vol. 248, pp. 1283-1297, 2004.
Gautam et al., "Soft Chemical Routes to Semiconductor Nanostructures," Pramana Journal of Physics, vol. 65, No. 4, pp. 549-564, Oct. 2005.
Gregg, "Excitonic Solar Cells," Journal of Physical Chemistry B., vol. 107, pp. 4688-4698, No. 20, May 1, 2003.
Hara et al., "Effect of Additives on the Photovoltaic Performance of Coumarin-Dye-Sensitized Nanocrystalline $TiO_2$ Solar Cells," Langmuir, vol. 20, No. 10, pp. 4205-4210, 2004.
http://en.wikipedia.org/wiki/Quantum_dot_solar_cell, "Nanocrystal Solar Cell," 1 page, printed Oct. 17, 2007.
http://findarticles.com/articles/mi_qa3776/is_200605ai_n17176721/print, "Ultradense GaN Nanopillar and Nanopore Arrays by Self-Assembly Nanopatterning," 4 pages, May 5, 2008.
http://www.evidenttech.com, Evident Technologies Webpages, 11 pages, printed Oct. 17, 2007.
http://www.i-sis.org.uk/QDAUESC.php, "Quantum Dots and Ultra-Efficient Solar Cells?" ISIS Press Release, Jan. 19, 2006.
Hwang et al., "A Highly Efficient Organic Sensitizer for Dye-Sensitized Solar Cells," Chemical Communications, 5 pages, printed Sep. 27, 2007.
ISBN No. 7-04-009141-0, 8 pages, 2001, 2003.
ISBN No. 978-7-03-015873-4, 8 pages, 2005.
Kay et al., "Artificial Photosynthesis. 1. Photosensitization of $TiO_2$ Solar Cells with Chlorophyll Derivatives and Related Natural Porphyrins," Journal of Physical Chemistry, vol. 97, No. 23, pp. 6272-6277, 1993.
Kim et al., "Enhanced Photocatalytic Activity in Composites of $TiO_2$ Nanotubes and Cds Nanoparticles," Chem. Commun., pp. 5024-5026, 2006.
Klimov, "Spectral and Dynamical Properties of Multiexcitons in Semiconductor Nanocrystals," ANRV, vol. 308-PC58-24, pp. 635-673, Dec. 2, 2006.
Kline et al., "Highly Oriented Crystals at the Buried Interface in Polythiophene Thin-Film Transistors," Nature Materials, vol. 5, pp. 222-228, Mar. 2006.
Kouklin et al., "Ultradense GaN Nanopillar and Nanopore Arrays by Self-Assembly and Nanopatternint," Journal of Electronic Materials, vol. 35, No. 5, pp. 1133-1137, May 2006.
Kuzyk, "Erratum: Physical Limits on Electronic Nonlinear Molecular Susceptibilities," Physical Review Letters, vol. 90, No. 3, 1 page, Jan. 2003.
Kuzyk, "Fundamental Limits on Third-Order Molecular Susceptibilities," Optics Letters, vol. 25, No. 16, pp. 1183-1185, Aug. 15, 2000.
Kuzyk, "Physical Limits on Electronic Nonlinear Molecular Susceptibilities," Physical Review Letters, vol. 85, No. 6, pp. 1218-1221, Aug. 7, 2000.
Lee et al., "CdSe Quantum Dot-Sensitized Solar Cells Exceeding Efficiency 1% at Full-Sun Intensity," Journal of Physical Chemistry C, vol. 112, No. 30, pp. 11600-11608, Jul. 4, 2008.
Lee et al., "Fabrication of Aligned TiO2 One-Dimensional Nanostructured Arrays Using a OneStep Templating Solution Approach," The Journal of Physical Chemistry Letters B, vol. 109, No. 27, pp. 13056-13059, Jun. 2005.
Li et al., "Band-Structure-Corrected Local Density Approximation Study of Semiconductor Quantum Dots and Wires," Physical Review B., vol. 72, 15 pages, 2005.

Li et al., "Conducting Polythiophenes with a Broad Spectrum of Reactive Groups," Journal of Polymer Science A, Polymer Chemistry, vol. 43, pp. 4547-4558, 2005.
Li et al., "Review of Recent Progress in Solid-State Dye-Sensitized Solar Cells," Solar Energy Materials and Solar Cells, vol. 90, pp. 549-573, 2006.
Liang et al., "Calculation of the Vibrationally Non-Relaxed Photo-Induced Electron Transfer Rate Constant in Dye-Sensitized Solar Cells," Physical Chemistry Chemical Physics, vol. 9, pp. 853-861, 2007.
Marcus et al, "Electron Transfers in Chemistry and Biology," Biochimica et Biophysica Acta, vol. 811, pp. 265-322, 1985.
Marcus et al., "Electron Transfer Reactions in Chemistry, Theory and Experiment," Reviews of Modern Physics, vol. 65, No. 3, pp. 599-610, Jul. 1993.
Marcus, "Electrostatic Free Energy and Other Properties of States Having Nonequilibrium Polarization. I," The Journal of Chemical Physics, vol. 24, No. 5, 11 pages, May 1956.
Marcus, "On the Theory of Oxidation-Reduction Reactions Involving Electron Transfer. I," The Journal of Chemical Physics, vol. 24, No. 5, 13 pages, May 1956.
Meier et al., "Fast Electron Transfer Across Semiconductor-Molecule Interfaces: GaAs/Co(Cp)2," Journal of Physical Chemistry B., vol. 103, pp. 2122-2141, 1999.
Milliron et al., "Electroactive Surfactant Designed to Mediate Electron Transfer Between CdSe Nanocrystals and Organic Semiconductors," Advanced Materials, vol. 15, No. 1, pp. 58-61, Jan. 3, 2003.
Morrison et al., Organic Chemistry, Sixth Edition, Chapter 6, pp. 240-242, 1992.
Neale et al., "Effect of a Coadsorbent on the Performance of Dye-Sensitized $TiO_2$ Solar Cells: Shielding Versus Band-Edge Movement," Journal of Physical Chemistry B., vol. 109, No. 49, pp. 23183-23189, 2005.
Nenitescu, Chimie Organica, vol. I, p. 522, 1980.
Nenitescu, Chimie Organica, vol. II, p. 581, 1980.
Nilsing et al., "Phosphonic Acid Adsorption at the $TiO_2$ Anatase (101) Surface Investigated by Periodic Hybrid HF-DFT Computations," Surface Science, vol. 582, pp. 49-60, 2005.
Nozick et al., "Quantum Dot Solar Cells," Physica E, vol. 14, pp. 115-120, 2002.
O'Reagan et al., "A Low-Cost, High Efficiency Solar Cell Based on Dye-Sensitized Colloidal $TiO_2$ Films," Nature, vol. 353, pp. 737-740, Oct. 24, 1991.
Oyaizu et al., "Linear Ladder-Type Conjugated Polymers Composed of Fused Thiophene Ring Systems," Macromolecules, vol. 37, No. 4, pp. 1257-1270, 2004.
Palomares et al., "Control of Charge Recombination Dynamics in Dye Sensitized Solar Cells by the Use of Conformally Deposited Metal Oxide Blocking Layers," Journal of the American Chemical Society, vol. 125, No. 2, pp. 475-482, 2003.
Peet et al., "Efficiency Enhancement in Low-bandgap Polymer Solar Cells by Processing with Alkane Dithiols," Nature Materials, Advance Online Publication, pp. 1-4, May 27, 2007.
Perez-Moreno et al., "Modulated Conjugation as a Means for Attaining a Record High Intrinsic Hyperpolarizability," Optics Letters, vol. 32, No. 1, pp. 59-61, Jan. 1, 2007.
Pomerantz et al., "Synthesis and Properties of Poly[3-(w-bromoalkyl)thiophene]," Synthetic Metals, vol. 101, 1 page, 1999.
Pomerantz et al., "Synthesis and Study of Poly(3-hexylthiophenes) and Poly(3-dodecylthiophenes) Containing Halogen and Sulfer Substitutes in the W-Position of the Side Chain," ARKIVOC pp. 119-137, 2003.
Qian et al., "Gallium Nitride-Based Nanowire Radial Heterostructures for Nanophotonics," NanoLetters, vol. 4, No. 10, pp. 1975-1979, 2004.
Qiu et al., "Fabrication of $TiO_2$ Nanotube Film by Well-Aligned ZnO Nanorod Array Film and Sol-Gel Process " Thin Solid Films vol. 515, pp. 2897-2902, 2007.
Robel et al., "Quantum Dot Solar Cells, Harvesting Light Energy with CdSe Nanocrystals Molecularly Linked to Mesoscopic $TiO_2$ Films," Journal of the American Chemical Society, vol. 128, No. 7, pp. 2385-2393, 2006.
Robel et al., "Size-Dependent Electron Injection from Excited CdSeQuantum Dots into TiO2 Nanoparticles," JACS Communications, 2 pages, Mar. 21, 2007.

Wang et al. "Enhance the Performance of Dye-Sensitized Solar Cells by Co-grafting Amphiphilic Sensitizer and Hexadecylmalonic Acid on $TiO_2$ Nanocrystals," Journal of Physical Chemistry B., vol. 107, No. 51, pp. 14336-14341, 2003.
Wu et al., "Superior Radiation Resistance of $In_{1-x}$-GaxN Alloys: Full-Solar-Spectrum Photovoltaic Material System," Journal of Applied Physics, vol. 24, No. 10, pp. 6477-6482, Nov. 15, 2003.
Xu et al., "New Triphenylamine-Based Dyes for Dye-Sensitized Solar Cells," Journal of Physical Chemistry C, vol. 112, No. 3, pp. 874-880, 2008.
Yum et al., "Efficient Co-Sensitization of Nanocrystalline $TiO_2$ Films by Organic Sensitizers," Chemical Communications, 7 pages, printed Sep. 27, 2007.
Banerjee et al., "Synthesis and Characterization of Carbon Nanotube-Nanocrystal Heterostructures," Nano Letters, vol. 2, No. 3, pp. 195-200, 2002.
Clarke et al., "Photophysics of Dopamine-Modified Quantum Dots and Effects on Biological Systems," Nature Materials, vol. 5, pp. 409-417, May 2006.
Gebeyehu et al., "Hybrid Solar Cells Based on Dye-Sensitized Nanoporous $TiO_2$ Electrodes and Conjugated Polymers as Hole Transport Materials," Synthetic Metals, vol. 125, pp. 279-287, 2002.
Huang et al., "Preparation and Application of L-Cysteine-Modified CdSe/CdS Core/Shell Nanocrystals as a Novel Flourescence Probe for Detection of Nucleic Acid," Spectrochimica Acta Part A, vol. 70, pp. 318-323, 2008.
Huber et al., "The Role of Surface States in the Ultrafast Photoinduced Electron Transfer from Sensitizing Dye Molecules to Semiconductor Colloids," Journal Phys. Chemistry B, vol. 104, No. 38, pp. 8995-9003, 2000.
Landes et al., "On the Nanoparticle to Molecular Size Transition: Flourescence Quenching Studies," vol. 105, No. 43, pp. 10554-10558, 2001.
Law et al., "$ZnO-Al_2O_3$ and $ZnO-TiO_2$ Core-Shell Nanowire Dye-Sensitized Solar Cells," Journal Phys. Chemistry B, vol. 110, No. 45, pp. 22652-22663, 2006.
Leschkies et al., "Photosensitization of ZnO Nanowires with CdSe Quantum Dots for Photovoltaic Devices," Nano Letters, vol. 7, No. 6, pp. 1793-1798, 2007.
Ma et al., "A Sensitive Method for the Detection of Catecholamine Based on Fourescence Quenching of CdSe Nanocrystals," Talanta, vol. 67, pp. 979-983, 2005.
Mora-Sero et al., "Factors Determining the Photovoltaic Performance of a CdSe Quantum Dot Sensitized Solar Cell: the Role of the Linker Molecule and of the Counter Electrode," Nanotechnology, vol. 19, 7 pages, 2008.
Olson et al., "The Effect of Atmosphere and ZnO Morphology on the Performance of Hybrid Poly (3-Hexylthiophene)/ZnO Nanofiber Photovoltaic Devices," Journal Phys. Chemistry C, vol. 111, No. 44, pp. 16670-16678, 2007.
Plass et al., "Quantum Dot Sensitization of Organic-Inorganic Hybrid Solar Cells," Journal Phys. Chemistry B, vol. 106, No. 31, pp. 7578-7580, 2002.
Quintana et al., "Comparison of Dye-Sensitized ZnO and TiO2 Solar Cells: Studies of Charge Transport and Carrier Lifetime," pp. 1035-1041, Journal Phys. Chemistry C, vol. 111, No. 2, pp. 1035-1041, 2007 (published on web Dec. 14, 2006).
Sharma et al., "Photoinduced Charge Transfer Between CdSe Quantum Dots and p-Phenylenediamine," Journal Phys. Chemist B, vol. 107, No. 37, pp. 10088-10093, 2003.
Snaith et al., "Self-Organization of Nanocrystals in Polymer Brushes. Application in Heterojunction Photovoltaic Diodes," Nano Letters, vol. 5, No. 9, pp. 1653-1657, 2005.
Wu et al., "Phosphate-Modified $TiO_2$ Nanoparticles for Selective Detection of Dopamine, Levodopa, Adrenaline, and Catechol Based on Flourescence Quenching," Langmuir, vol. 23, No. 14, pp. 7880-7885, 2007.
Zhai et al., "A Simple Method to Generate Side-Chain Derivatives of Regioregular Polythiophene Via the GRIM Metathesis and Post-Polymerization Functionalization," Macromolecules, vol. 36, No. 1, pp. 61-64, 2003 (published on web Dec. 14, 2002).

* cited by examiner

COUNTER ELECTRODE FOR SOLAR CELL

CROSS-REFERENCE TO RELATED APPLICATIONS

This application is related to U.S. patent application Ser. No. 12/502,782, filed Jul. 14, 2009 and entitled "QUANTUM DOT SOLAR CELL" and to U.S. patent application Ser. No. 12/468,755, filed May 19, 2009 and entitled "SOLAR CELL WITH ENHANCED EFFICIENCY", the entire disclosures of which are incorporated herein by reference.

TECHNICAL FIELD

The disclosure generally pertains to solar cells. More particularly, the disclosure pertains to dye-sensitized and/or nanocrystal-sensitized solar cells.

BACKGROUND

A wide variety of solar cells have been developed for converting sunlight into electricity. Of the known solar cells, each has certain advantages and disadvantages. There is an ongoing need to provide alternative solar cells as well as alternative methods for manufacturing solar cells.

SUMMARY

The disclosure pertains generally to solar cells and, more particularly, to dye-sensitized and/or nanocrystal-sensitized solar cells. Also disclosed are counter electrodes for solar cells including dye-sensitized and/or nanocrystal-sensitized solar cells.

An example counter electrode for a solar cell may include a substrate, a microstructured template disposed on the substrate, and a layer of catalytic material on the microstructured template.

An example solar cell may include a photoelectrode and a counter electrode. The counter electrode may include a microstructured template. A layer of catalytic material may be disposed on the microstructured template. An active layer may be disposed between the photoelectrode and the counter electrode. An example method for manufacturing a solar cell may include providing a substrate, forming a microstructured template on the substrate, disposing a layer of catalytic material on the microstructured template, providing a photoelectrode, and providing an active layer between the catalytic material and the photoelectrode. In some instances, the substrate, microstructured template, catalytic material, active layer and photoelectrode may be coupled together.

The above summary is not intended to describe each and every disclosed embodiment or every implementation of the disclosure. The Description that follows more particularly exemplify the various illustrative embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following description of various embodiments in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular illustrative embodiments described. On the contrary, the intention is to cover all modifications, equivalents, and alternatives falling within the spirit and scope of the invention.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings. The drawings, which are not necessarily to scale, depict an illustrative embodiments and are not intended to limit the scope of the invention.

A wide variety of solar cells (which also may be known as photovoltaics and/or photovoltaic cells) have been developed for converting sunlight into electricity. Some example solar cells include a layer of crystalline silicon. Second and third generation solar cells often utilize a film of photovoltaic material (e.g., a "thin" film) deposited or otherwise provided on a substrate. These solar cells may be categorized according to the photovoltaic material deposited. For example, inorganic thin-film photovoltaics may include a thin film of amorphous silicon, microcrystalline silicon, CdS, CdTe, $Cu_2S$, copper indium diselenide (CIS), copper indium gallium diselenide (CIGS), etc. Organic thin-film photovoltaics may include a thin film of a polymer or polymers, bulk heterojunctions, ordered heterojunctions, a fullerence, a polymer/fullerence blend, photosynthetic materials, etc. These are only examples.

Another type of solar cell utilizes a photosensitive dye or nanocrystals to generate electricity. The dye in these dye-sensitized solar cells (and/or the nanocrystals in the nanocrystal-sensitized solar cells) absorbs photons and, as a result, inject or otherwise direct electrons to an electron conductor material. An electrolyte solution in the cell typically reduces the dye back to its original electrical state. These dye-sensitized solar cells may be desirable due to their relatively simple construction and lower material costs.

Figure 1:
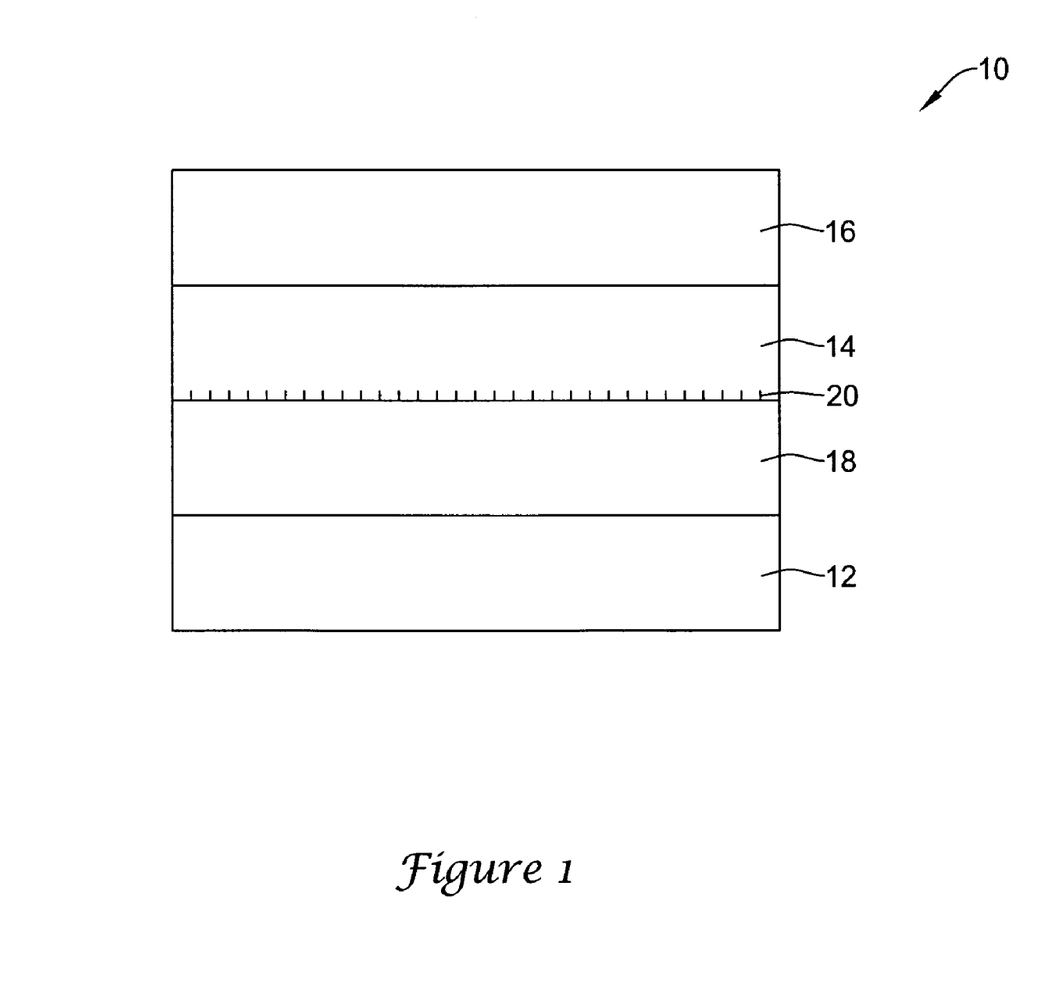
FIG. 1 is a schematic view of an illustrative but non-limiting example of a solar cell.

FIG. 1 illustrates an example solar cell 10. In at least some embodiments, solar cell 10 may be a nanocrystal-sensitized or dye-sensitized solar cell. Solar cell 10 may include a first electrode or photoelectrode 12, a second or counter electrode 16, and an active layer 14 generally disposed between photoelectrode 12 and counter electrode 16.

Photoelectrode 12 and/or counter electrode 16 may be made from a number of different materials including polymers, glass, and/or transparent materials. For example, photoelectrode 12 and/or counter electrode 16 may include polyethylene terephthalate, polyimide, low-iron glass, fluorine-doped tin oxide, indium tin oxide, Al-doped zinc oxide, any other suitable conductive inorganic element(s) or compound(s), conductive polymer(s), and other electrically conductive materials, combinations thereof, or any other suitable material or material combination. In some embodiments, counter electrode 16 may include a substrate and/or the counter electrode may be referred to as being a substrate, for example, to which materials including catalytic and/or electrically conductive materials may be coupled to so as to define the counter electrode 16.

In some embodiments, a layer of material 18, for example a layer of electron conductor material, may be disposed on photoelectrode 12, although this is not required in all embodiments. Layer 18 may be formed of any suitable material or material combination. In some cases, layer 18 may be an n-type electron conductor. The layer 18 may be metallic, such as $TiO_2$ or ZnO. In some cases, layer 18 may be an electrically conducting polymer, such as a polymer that has been doped to be electrically conducting or to improve its electrical conductivity.

Active layer 14 may include an electrolyte. In these embodiments, active layer 14 may also include a photosensitive dye 20 that may be disposed, for example, adjacent layer 18 when layer 18 is provided or adjacent layer 12 when layer 18 is not provided. Photosensitive dye 20 may be any suitable material. For example, photosensitive dye 20 may include triscarboxy-ruthenium terpyridine [Ru(4,4',4''-(COOH)$_3$-terpy)(NCS)$_3$], a ruthenium-polypyridine dye, other ruthenium complex materials, 1-ethyl-3 methylimidazolium tetrocyanoborate [EMIB(CN)$_4$], copper-diselenium [Cu(In,GA)Se$_2$], and the like, or any other suitable materials. In general, photosensitive dye 20 may be configured to release or otherwise inject electrons onto, for example, layer 18 upon absorption of a photon. In other embodiments, one or more alternative or additional semiconductor materials may be utilized in cell 10 in order to generate electrons and/or holes.

Photosensitive dye 20 may bond or otherwise tend to accumulate on or above layer 18. It can be appreciated that the amount of photosensitive dye 20 present in cell, or more particularly the density of the photosensitive dye 20 adjacent the surface of layer 18 in the illustrative embodiment, may impact the overall efficiency of cell 10. In order to increase the amount of photosensitive dye 20 present on layer 18 and available for electron transfer to layer 18, it may be desirable for the overall effective surface area of the photosensitive dye 20 to be increase. To this end, in some cases, layer 18 may be formed or otherwise include a structured pattern or array of, for example, nanoparticles, nanopillars, nanowires, or the like that results in an increased surface area. Alternatively, layer 18 may be a generally porous layer with an overall increase in surface area relative to a planar layer. Such configurations may increase the surface area of layer 18 such that the effectiveness of the photosensitive dye 20 may be increased along and/or adjacent layer 18, if desired.

In some illustrative embodiments, where active layer 14 includes an electrolyte, active layer 14 may include redox couple that includes, for example, iodide (I$^-$) and triiodide (I$_3^-$). Other redox couples are contemplated. In general, and in the illustrative embodiment, active layer 14 may be configured to provide electrons to photosensitive dye 20 after photosensitive dye 20 has injected or otherwise passed an electron to layer 18. For example, iodide may oxidized to triiodide so as to contribute an electron to photosensitive dye 20. In turn, the triiodide may recover an electron from counter electrode 16, thus reducing triiodide to iodide. In some cases, the reduction of triiodide may be improved by providing a catalyst or a catalytic material on counter electrode 16. For example, counter electrode 16 may include platinum, gold, combinations thereof, and the like, and/or any other suitable material or materials that may catalyze a desirable reaction such as the reduction of triiodide.

Figure 2:
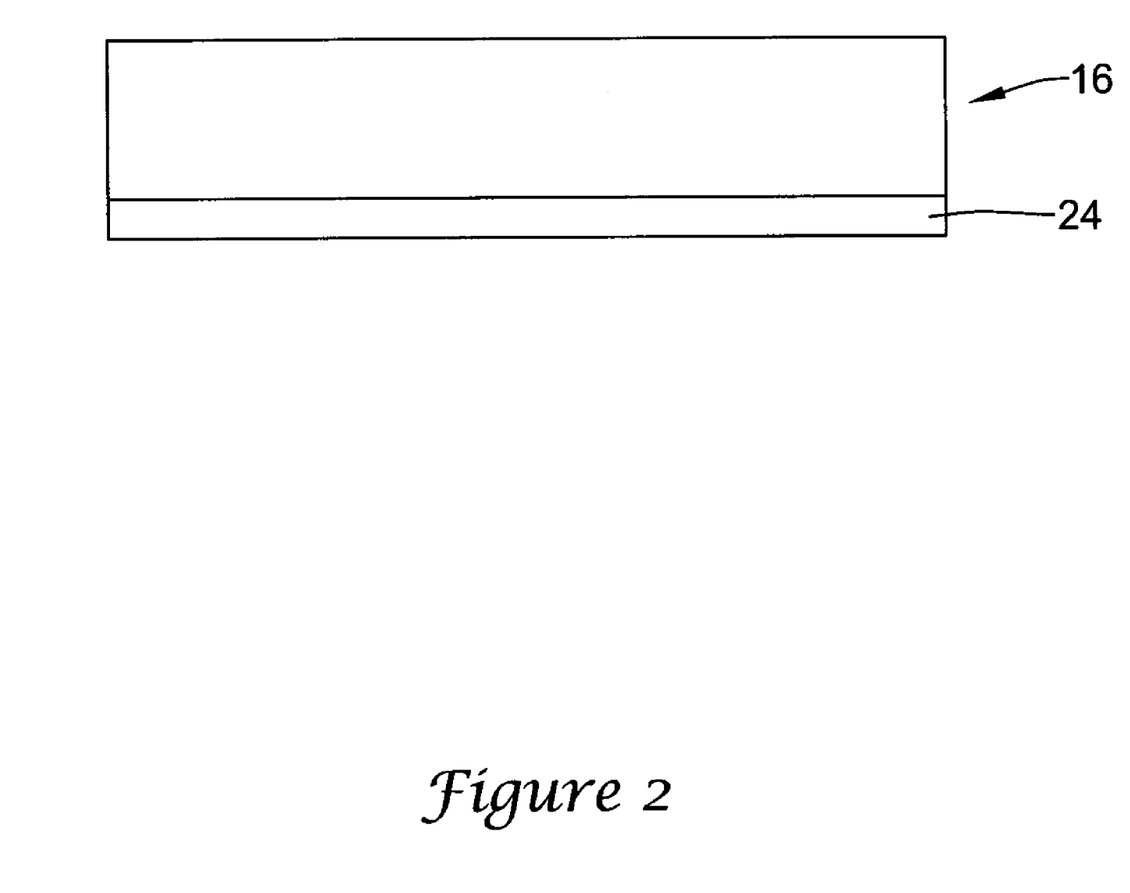
FIG. 2 is a schematic view of a portion of an example solar cell including a counter electrode.

In order to further improve the reduction of triiodide, counter electrode 16 may include a microstructured template 24 as shown in FIG. 2. In general, microstructured template 24 may be configured to increase the surface area available for catalyzing, for example, the reduction of triiodide in cell 10. This may result in microstructured template 24 taking the form of a scaffolding, mesoporous film, matrix, or other structure that allows a greater surface area of a catalytic material engaging counter electrode 16, thus enhancing the ability of cell 10 to reduce triiodide to iodide.

Figure 3:
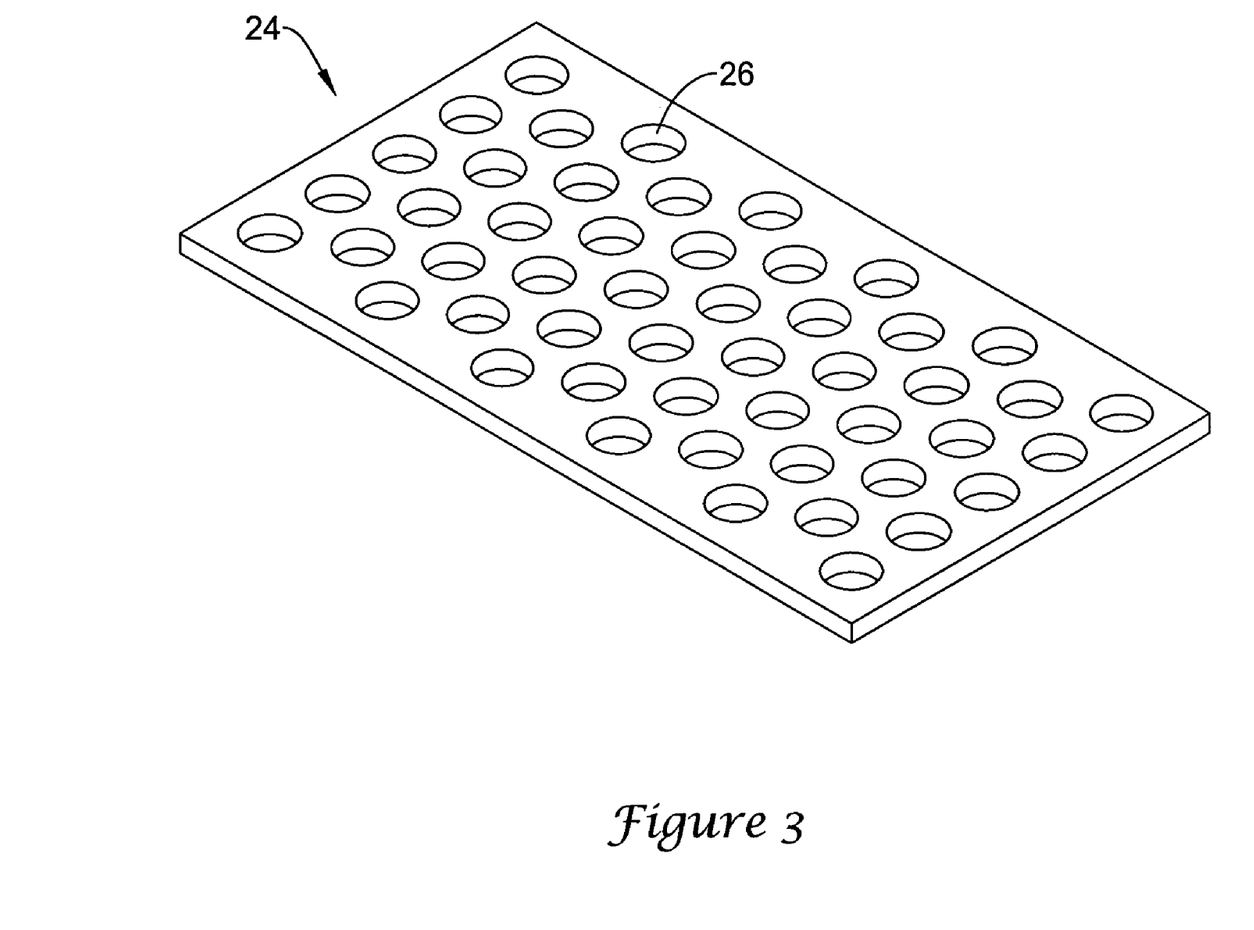
FIG. 3 is a schematic view of a portion of an example solar cell including a counter electrode.

As indicated above, microstructured template 24 may have a structural configuration that allows the surface area thereof to be increased and available as a substrate for a catalytic material. For example, microstructured template 24 may have a three dimensional structure such as illustrated in FIG. 3. In this example, microstructured template 24 may have a plurality of pores or openings 26 formed therein. The pores 26 may extend all the way through template 24 or part of the way through. These are just examples of some suitable configurations that are contemplated. For example, microstructured template 24 may include a series of projections, depressions, pillars, wires, or the like, or any other suitable configuration. Other arrangements are also contemplated. In some embodiments, template 24 may include a polymer and organic micelle. Alternatively, microstructured template 24 may be an inorganic template. Such a template may be disposed on counter electrode 16 using any suitable methodology such as through a suitable imprinting and/or nanoimprinting technique so as to form, for example, an inorganic nanoimprinted film.

Figure 4:
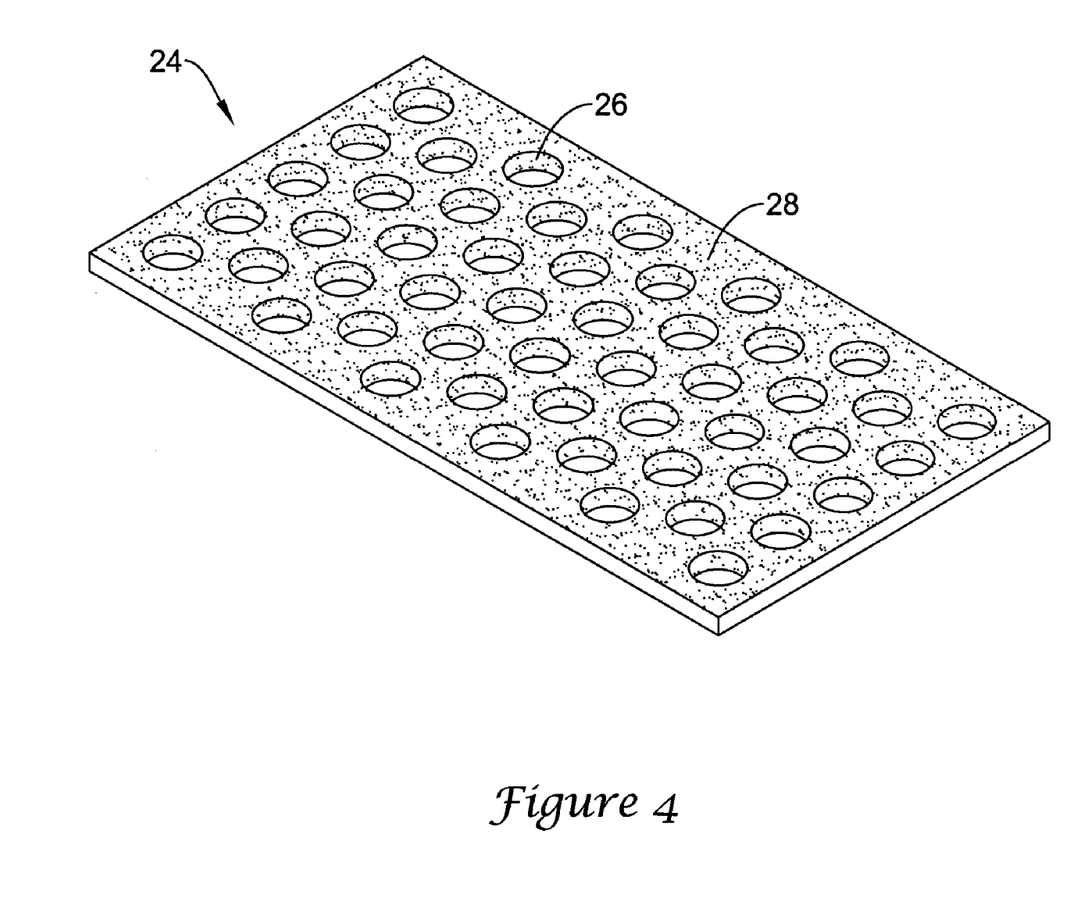
FIG. 4 is a schematic view of a portion of an example solar cell including a counter electrode.

A layer of material 28, for example catalytic material, may be disposed on microstructured template 24 as illustrated in FIG. 4. In at least some embodiments, layer 28 may include platinum, gold, combinations thereof, or any other suitable material. These are just examples.

Figure 5:
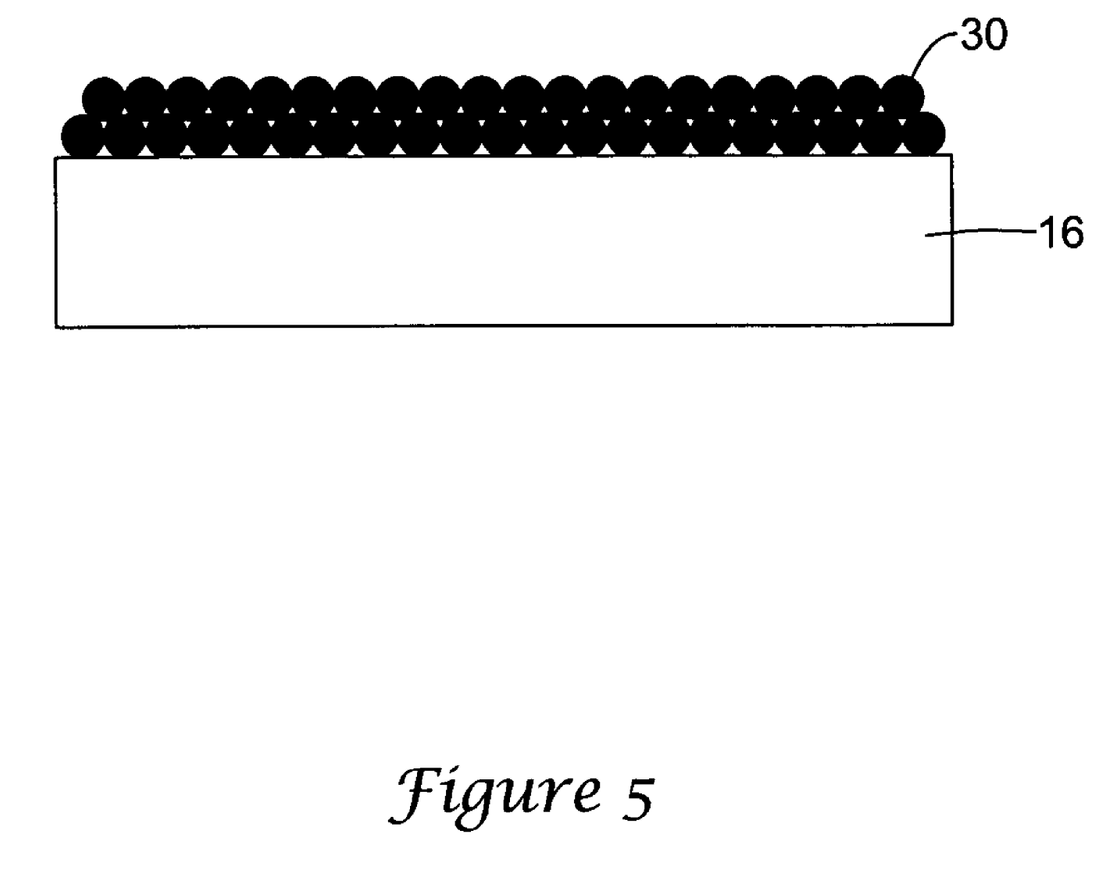
FIGS. 5-8 illustrate an example method for forming a counter electrode for a solar cell.

The microstructured template 24 may be formed in a number of different ways. For example, forming microstructured template 24 may include disposing one or more layers of material 30 on a substrate (which may also be referred to as disposing the material 30 on counter electrode 16) as illustrated in FIG. 5. Material 30 may be a sacrificial layer that forms a mold from which microstructured template 24 may be ultimately formed. Material 30 may vary and in some embodiments, may include one or more layers of polystyrene microspheres 30. This may include disposing an opal film of polystyrene microspheres 30 on a counter electrode substrate 16.

Figure 6:
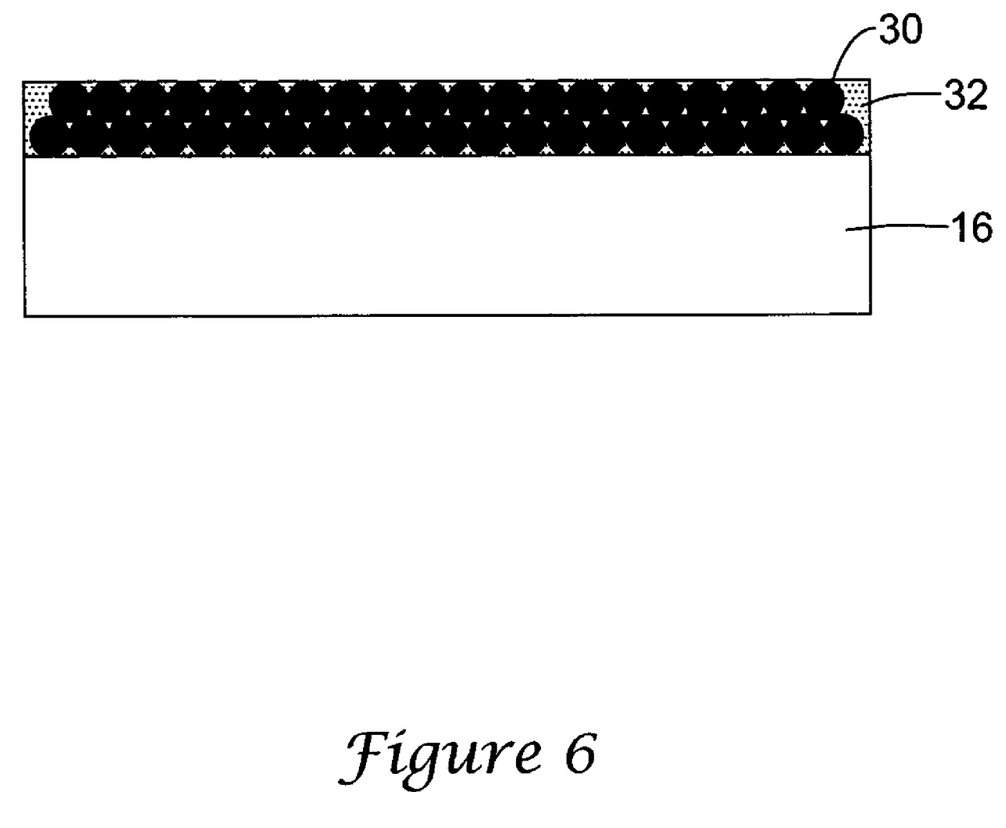
Figure 7:
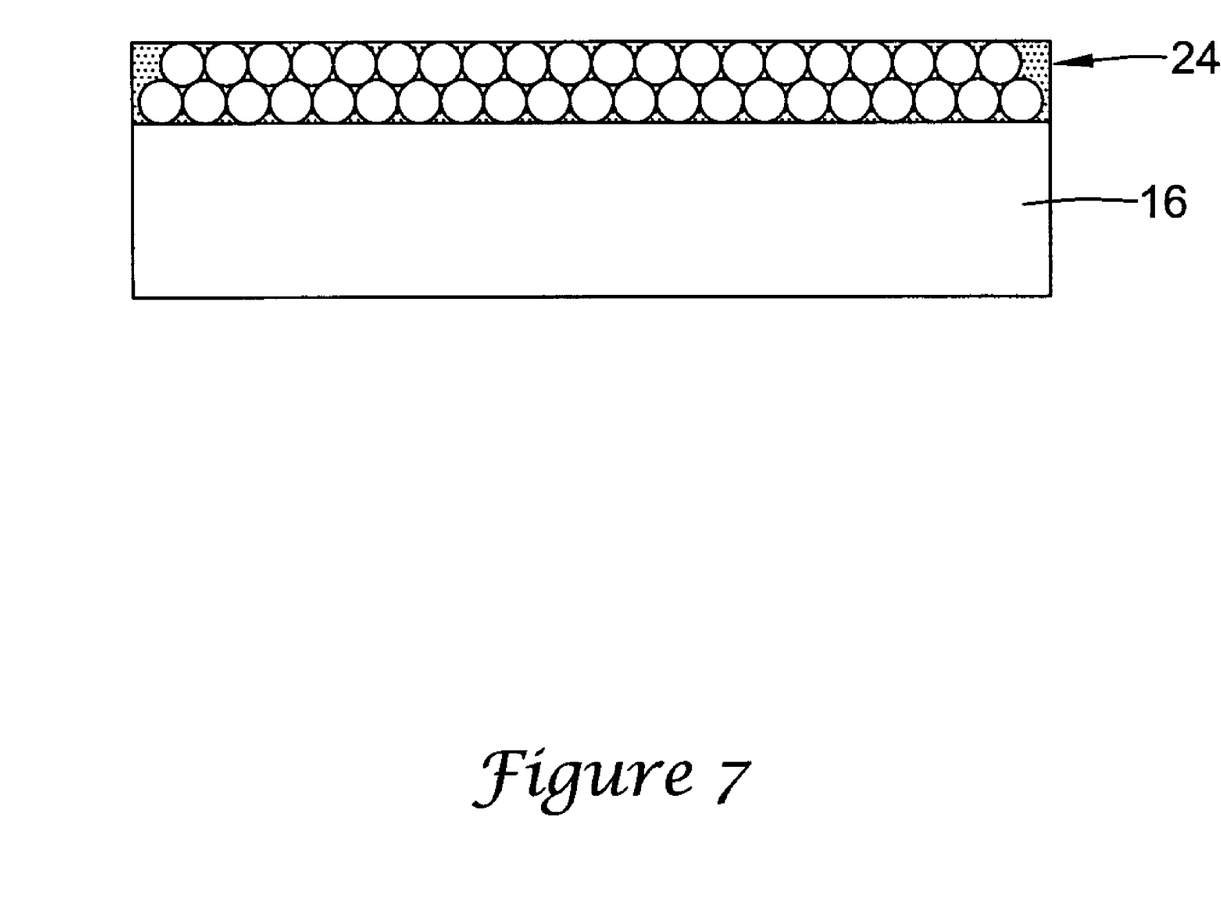

Another layer of material 32, for example a layer of conductive material, may be disposed on the polystyrene microspheres 30 as illustrated in FIG. 6. Material 32 may be any suitable material and in some embodiments may be Al-doped zinc oxide, indium tin oxide, CuS, CoS, a conductive polymer such as chitosan, or any other suitable material. Disposing material 32 on the polystyrene microspheres 30 may be done using any suitable method such as by chemical bath deposition, dip coating, a sol-gel method, combinations thereof, or any other suitable technique as desired. Subsequently, the polystyrene microspheres 30 may be removed as illustrated in FIG. 7, forming or otherwise leaving behind microstructured template 24. In this example, microstructured template 24 may have an inverse opal structure or configuration.

The step of disposing conductive material 32 on the polystyrene microspheres 30 may vary, for example, depending on the composition of material 32. For example, an Al-doped zinc oxide polycrystalline film (e.g., in an illustrative embodiment that utilizes Al-doped zinc oxide for material 32) may be prepared for a sol-gel dip coating process in a 0.5M zinc acetate in isopropanol solution stabilized by diethanolamine and doped with aluminum nitrate ethanol solutions. The aluminum content in the sol may be about 1% or so. The resultant crystalline ZnO thin films may be annealed at about 500° C. (which may be suitable to remove the sacrificial polystyrene microspheres 30) for about 1 hour. The heat may be sufficient to remove the polystyrene microspheres 30. Alternatively, or in addition, a solvent such a THF may be used to remove the polystyrene microspheres 30 if desired.

When layer 32 includes CuS, for example, a mesoporous film may be formed via a chemical bath deposition method. For example, a 0.5M solution of copper(II) chloride, 3.7M triethanolamine, 7.6M ammonia in 1M sodium hydroxide, 1M thiourea, and deionized water. The substrate (e.g., counter electrode 16) may be immersed (e.g., vertically) into this solution and heated at about 30° C. for about 4 hours. The substrate may be washed with deionized water and moved to the vacuum oven at about 40° C. for about 40 minutes, and then annealed at about 160° C. for about 10 minutes.

Disposing layer 28 of catalytic material on microstructured template 24 may be done using any suitable technique. For example, disposing layer 28 on microstructured template 24 may include disposing a layer of $H_6PtCl_6$, $HAuCl_4$, or both (e.g., as a solution or solutions in isopropanol) on microstructured template 24. Such a step may occur over a period of time, for example about 10 seconds. Template 24 may then be heated (e.g., at about 380-450° C. or so), which may dispose activated platinum and/or gold on template 24 and, thus, counter electrode 16. In other embodiments, a thermal decomposition method may be used to add the layer of catalytic material.

Figure 8:
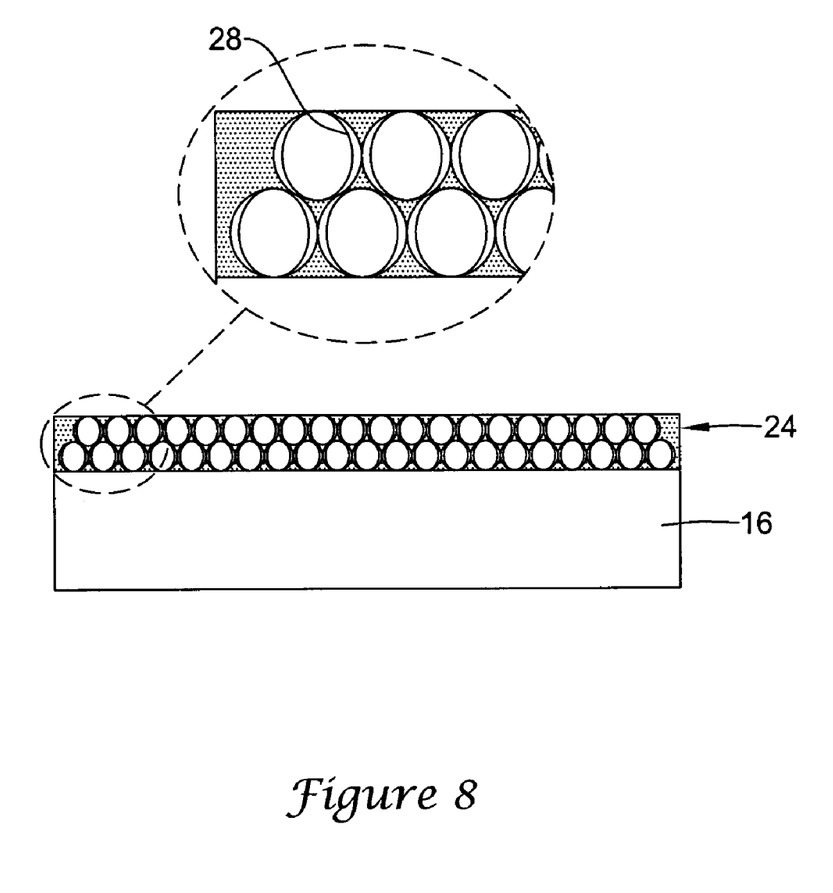

As shown in FIG. 8, the layer of catalytic material 28 may coat at least a portion of the surfaces of the microstructured template 24 of counter electrode 16, and may be available for reaction with an adjacent electrolyte. For example, the catalytic material 28 may be exposed to an adjacent electrolyte, and may be configured to help reduce triiodide in embodiments where active layer 14 includes photosensitive dye 20 and an electrolyte. Other arrangements are also contemplated. In some cases, it may be desirable to add a layer such as platinum and/or gold between counter electrode 16 and the layer of catalytic material 28. This layer may be added using any suitable methodology such as through ion sputtering.

Other embodiments may include coating a precursor or moldable material on counter electrode 16 and performing a nano-imprinting process to form a microstructured template 24. The moldable material may be disposed on counter electrode 16 in a manner analogous to how the polystyrene microspheres 30 are disposed on counter electrode 16. A preformed nanostructured template (e.g., a stainless steel stamp with arrays of nano-pillars formed thereon) may be pressed against the moldable material. This may form microstructured template 24. Subsequently, material 32 may be disposed on the nanostructured material so as fill in or otherwise coat the structure of the nanopillars. If desired, the moldable material may be removed using heat, a solvent, or any other suitable methodology, if desired. A catalytic material 28 may be disposed on material 32.

The method for producing cell 10, thus, may include providing counter electrode 16 (which may be prepared as disclosed above and may have a microstructured template 24 coupled thereto), and disposing layer 28 of catalytic material on microstructured template 24. The method may also include providing a photoelectrode 12 (which may have layer 18 coupled thereto). Cell 10 may be assembled by attaching or joining electrodes 12/16 with active layer 14.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. A method for manufacturing a solar cell, the method comprising:
providing a substrate;
forming a microstructured template on the substrate;
disposing a layer of catalytic material on the microstructured template;
wherein the layer of catalytic material includes platinum, gold, or both;
providing a photoelectrode;
providing an active layer between the microstructured template and the photoelectrode; and
wherein the microstructured template the active layer and the photoelectrode are operatively coupled together.

2. The method of claim 1, wherein forming the microstructured template on the substrate includes providing an imprintable material and imprinting the imprintable material.

3. The method of claim 2, wherein imprinting the imprintable material includes stamping.

4. The method of claim 1, wherein the layer of catalytic material includes $H_6PtCl_6$.

5. The method of claim 1, wherein the layer of catalytic material includes $HAuCl_4$.

6. The method of claim 1, wherein the layer of catalytic material includes $H_6PtCl_6$ and $HAuCl_4$.

7. The method of claim 1, wherein disposing a layer of catalytic material on the microstructured template includes ion sputtering.

8. The method of claim 1, wherein the photoelectrode includes a layer of $TiO_2$.

9. A method for manufacturing a solar cell, the method comprising:
providing a substrate;
forming a microstructured template on the substrate;
disposing a layer of catalytic material on the microstructured template;
providing a photoelectrode;
providing an active layer between the microstructured template and the photoelectrode;
wherein the microstructured template, the active layer and the photoelectrode are operatively coupled together; and
wherein forming the microstructured template on the substrate includes disposing one or more three-dimensional layers of polystyrene microspheres.

10. The method of claim 9, further comprising disposing a layer of conductive material on the one or more three-dimensional layers of polystyrene microspheres and subsequently removing the one or more three-dimensional layers of polystyrene microspheres.

11. A method for manufacturing a solar cell, the method comprising:
- providing a substrate;
- forming a microstructured template on the substrate;
- disposing a layer of catalytic material on the microstructured template;
- providing a photoelectrode;
- providing an active layer between the microstructured template and the photoelectrode;
- wherein the microstructured template, the active layer and the photoelectrode are operatively coupled together; and
- wherein the active layer includes a photosensitive dye.

12. A method for manufacturing a solar cell, the method comprising:
- providing a substrate;
- forming a microstructured template on the substrate;
- disposing a layer of catalytic material on the microstructured template;
- providing a photoelectrode;
- providing an active layer between the microstructured template and the photoelectrode;
- wherein the microstructured template, the active layer and the photoelectrode are operatively coupled together; and
- wherein the active layer includes a nanocrystal layer.

* * * * *